United States Patent
Nomoto (10) Patent No.: US 7,961,574 B2
(45) Date of Patent: Jun. 14, 2011

(54) KIND IDENTIFYING APPARATUS, KIND IDENTIFYING METHOD, AND IDENTIFYING PROGRAM

(75) Inventor: Takayuki Nomoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 708 days.

(21) Appl. No.: 11/887,361

(22) PCT Filed: Mar. 27, 2006

(86) PCT No.: PCT/JP2006/306106
§ 371 (c)(1),
(2), (4) Date: May 6, 2008

(87) PCT Pub. No.: WO2006/106614
PCT Pub. Date: Oct. 12, 2006

(65) Prior Publication Data
US 2009/0103408 A1    Apr. 23, 2009

(30) Foreign Application Priority Data

Mar. 30, 2005   (JP) .............................. P2005-098295

(51) Int. Cl.
*G11B 7/00* (2006.01)
(52) U.S. Cl. ...................................... 369/53.2; 359/364
(58) Field of Classification Search ............... 369/53.22; 359/364
See application file for complete search history.

(56) References Cited

U.S. PATENT DOCUMENTS

| 5,956,302 | A  | * | 9/1999 | Maeda et al. | 369/44.23 |
| 7,110,180 | B2 | * | 9/2006 | Kawasaki et al. | 359/569 |
| 7,215,609 | B2 | * | 5/2007 | Shimano et al. | 369/44.37 |
| 7,428,201 | B2 | * | 9/2008 | Nakao et al. | 369/53.22 |
| 7,668,064 | B2 | * | 2/2010 | Kaji et al. | 369/109.01 |

FOREIGN PATENT DOCUMENTS

| JP | 9-270167 | 10/1997 |
| JP | 9-320180 | 12/1997 |
| JP | 10-74356 | 3/1998 |
| JP | 10-188458 | 7/1998 |
| JP | 10-302381 | 11/1998 |
| JP | 63-313327 | 12/1998 |
| WO | PCT/JP2005/012790 | * 1/2006 |

OTHER PUBLICATIONS

Thomas K. Gaylord et al., "Zero-reflectively high spatial-frequency rectangular-groove dielectric surface-relief gratings," Applied Optics, December 15, 1986, pp. 4562-4567, vol. 25, No. 24.

* cited by examiner

*Primary Examiner* — Aristotelis Psitos
(74) *Attorney, Agent, or Firm* — Drinker Biddle & Reath LLP (57) ABSTRACT

There is provided a type judgment device capable of rapidly and safely identifying the type of an optical disc while preventing unexpected information recording or information erase. An optical beam as parallel light is applied in a circular polarized state to an optical disc having recording tracks and the polarization characteristic in the reflected light is detected. According to the detected polarization characteristic, the type of the disc is judged in accordance with the interval of the adjacent recording tracks.

15 Claims, 6 Drawing Sheets

KIND IDENTIFYING APPARATUS, KIND IDENTIFYING METHOD, AND IDENTIFYING PROGRAM

TECHNICAL FIELD

The present invention relates to the technical field of a kind identifying apparatus, a kind identifying method, and an identifying program and, more particularly, to the technical field of a kind identifying apparatus and a kind identifying method for optically discriminating a plurality of kinds of recording media from each other, and an identifying program used for the kind discrimination.

BACKGROUND ART

In recent years, research and development related to high-recording-density optical discs represented by a DVD (Digital Versatile Disc) has been actively performed. Concurrently, a CD (Compact Disc) which is conventionally commonly used is still widespread.

Consequently, research and development on a so-called compatible recorder/player capable of recording/reproducing information to/from a plurality of kinds of optical discs having different recording densities by a single information recording/reproducing apparatus has been being also performed.

Some of the above-described various optical discs employ information recording/reproducing methods (recording/reproducing standards) different from each other or have physical structures (particularly, the distance between the surface on the light beam incident side to the information recording surface) different from each other. In the compatible recorder/player, to accurately and reliably record/reproduce information to/from each of a plurality of kinds of optical discs, the kind of a target optical disc is automatically identified prior to recording/reproduction of information and, by using the result of identification, parameters and the like in actual recording/reproduction have to be set.

Various conventional techniques for identifying the kind of an optical disc have been proposed. An example of the conventional techniques is a technique (A) using the RF (Radio Frequency) level in a reproduction signal (refer to Japanese Patent Application Laid-Open Nos. H9-270167 and H9-320180).

Another example is a technique (B) using the positional relation on a focus servo, between the surface of a disc and a reflection layer for reflecting a light beam (refer to Japanese Patent Application Laid-Open Nos. H10-074356 and H10-188458).

Further another example is a technique using the amplitude of a tracking error signal according to the push-pull method (refer to Japanese Patent Application Laid-Open No. H10-302381).

DISCLOSURE OF THE INVENTION

Problems to be Solved by the Invention

However, the conventional methods are based on the precondition that a light beam is condensed onto an optical disc in any of the cases. Consequently, there are the following problems.

(A) To condense a light beam, at least focus servo control is necessary. As a result, considerably long time is required to obtain an identification result.

(B) Due to the condensing of a light beam, energy is concentrated on one point on an optical disc and the temperature rises. In a write-once or rewritable optical disc, there is the possibility that information is unintentionally recorded or recorded information is erased.

(C) Due to necessity of condensing a light beam, an objective beam for condensing is disposed close to the surface of an optical lens. As a result, there is the possibility that the objective lens and an optical disc collide each other and are damaged. Particularly, the collision tends to occur immediately after loading of a different kind of an optical disc.

The present invention has been achieved in view of the drawbacks, and an object of the invention is to provide a kind identifying apparatus and a kind identifying method capable of identifying the kind of an optical disc promptly and safely while preventing unexpected information recording and information erasure, and an identifying program used for the kind identification.

Means for Achieving Object

To achieve the object, the present invention according to claim 1 provides a kind identifying apparatus including: irradiating means such as a semiconductor laser for emitting a light beam formed as parallel rays in a circularly polarized state to an optical recording medium in which recording tracks are formed; detecting means such as a detector for detecting a polarization characteristic in reflection light from the recording medium of the emitted light beam; and identifying means such as an identifying unit for identifying the kind of the recording medium according to interval of neighboring recording tracks on the basis of the detected polarization characteristic.

To achieve the object, the invention according to claim 13 provides a kind identifying method including: an irradiating step of emitting a light beam formed as parallel rays in a circularly polarized state to an optical recording medium in which recording tracks are formed; a detecting step of detecting a polarization characteristic in reflection light from the recording medium of the emitted light beam; and an identifying step of identifying the kind of the recording medium according to interval of neighboring recording tracks on the basis of the detected polarization characteristic.

To achieve the object, the invention according to claim 14 makes a computer function as the identifying means in the kind identifying apparatus according to any one of claims 1 to 12.

BRIEF DESCRIPTION OF DRAWINGS

FIGS. 1A to 1C are diagrams for explaining the principle of the present invention.

FIGS. 2A and 2B are diagrams for explaining the principle of the present invention.

DESCRIPTION OF REFERENCE NUMERALS

1 semiconductor laser
2 collimator lens
3 quarter wavelength plate
4 half mirror
5, 50, 51 polarization filters
5A, 5B, 5C, 5D, 5F, 5F, 50A, SOB, 50C, 50D, 50E, 50F, 51A, 51B, 51C, 51D, 51E, 51F divided polarization filters
6 detector
6A, 6B, 6C, 6D, 6E, 6F photodetectors
10 minimum value detecting unit
11 maximum value detecting unit
12 divider
13 comparator
S kind identifying apparatus
B, $B_1$ light beams
$B_2$ parallel-ray beam
$B_3$ circularly polarized light beam
R reflection light
DK optical disc

BEST MODE FOR CARRYING OUT THE INVENTION

Best modes for carrying out the present invention will now be described with reference to the drawings. The following embodiments relate to the case where the present invention is applied to a kind identifying apparatus mounted on an information recording/reproducing apparatus capable of recording/reproducing information to/from a CD, a DVD, or a high-density optical disc (hereinbelow, called BD) capable of recording information at density higher than that of the DVD, and the apparatus for identifying the kind of each of the optical discs such as the CD.

(I) Principle of the Invention

Prior to concrete description of embodiments of the present invention, the principle of the present invention will be described first with reference to FIGS. 1A to 1C and FIGS. 2A and 2B. FIGS. 1A to 1C and FIGS. 2A and 2B are diagrams for explaining the principle of the present invention.

Generally, it is known that when a laser beam is emitted to a diffraction grating having a grating cycle (grating pitch) equal to or less than the wavelength of a light beam such as the laser beam, the polarization characteristic (more concretely, rotation angle dependency of transmission light intensity in a polarization filter around the optical axis of the light beam as a rotation center, the definition will be the same in the following) in reflection light from the diffraction grating of the light beam changes according to the grating cycle (more concretely, refer to "Zero-reflectivity high spatial-frequency rectangular-groove dielectric surface-relief gratings", APPLIED OPTICS, 1986, vol. 25, no. 24 (pp 4562-pp 4567)).

On the other hand, in the above-described three kinds of optical discs, recording tracks in which phase pits are continuously formed (in the case of a read-only optical disc) or groove tracks which are preliminarily formed in a recordable optical disc are seen as projections and depressions from the light beam emission side. That is, the track can be regarded as a diffraction grating using the track pitch (the distance between neighboring recording tracks) as a grating cycle. Similarly, also in the case of a read-only optical disc in which recording tracks continuous in the circumferential direction are not actually formed because a plurality of phase pits are arranged in the circumferential direction, because of high density of the phase pits, the recording tracks can be regarded as approximately continuous recording tracks.

In the present invention, therefore, each of the optical discs is regarded as a diffraction grating using the track pitch as a grating cycle. A light beam as parallel rays having a beam diameter sufficient large with respect to the track pitch and in a circularly polarized state is applied to the optical disc, and the polarization characteristic of reflection light of the light beam is detected.

For example, in the case of discriminating the three kinds of the optical discs from each other, when the wavelength of the light beam is 780 nm, the polarization characteristic largely varies among a CD having a track pitch (=1600 nm) sufficiently wider than the wavelength, a BD having a track pitch (=740 nm) almost the same as the wavelength, and a BD having a track pitch (for example, 320 nm) narrower than the wavelength.

Figure 1A:
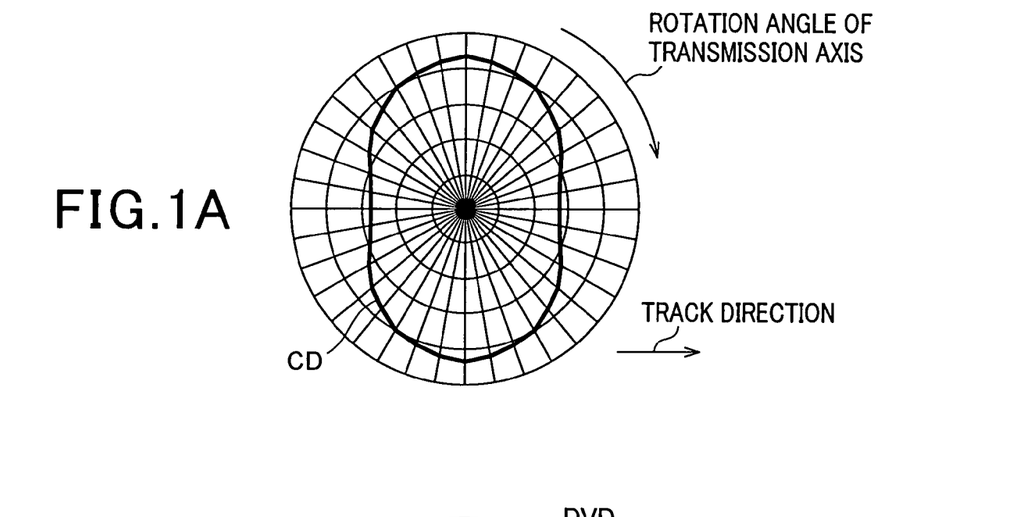
FIG. 1A is a diagram illustrating a polarization characteristic of reflection light from a CD.
Figure 1B:
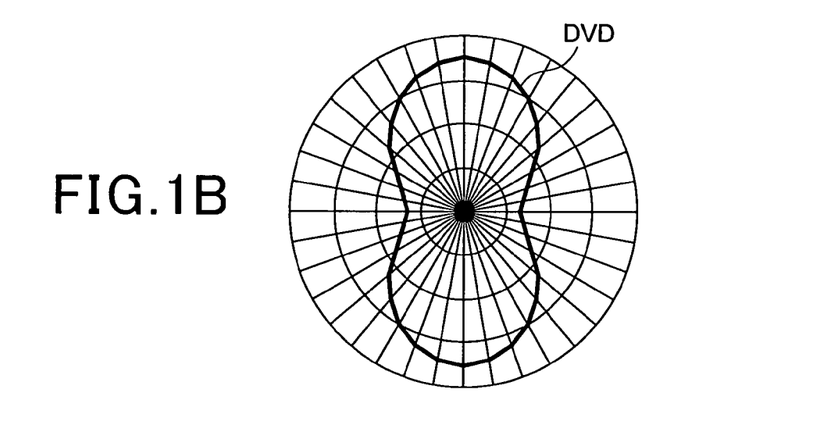
FIG. 1B is a diagram illustrating a polarization characteristic of reflection light from a DVD.
Figure 1C:
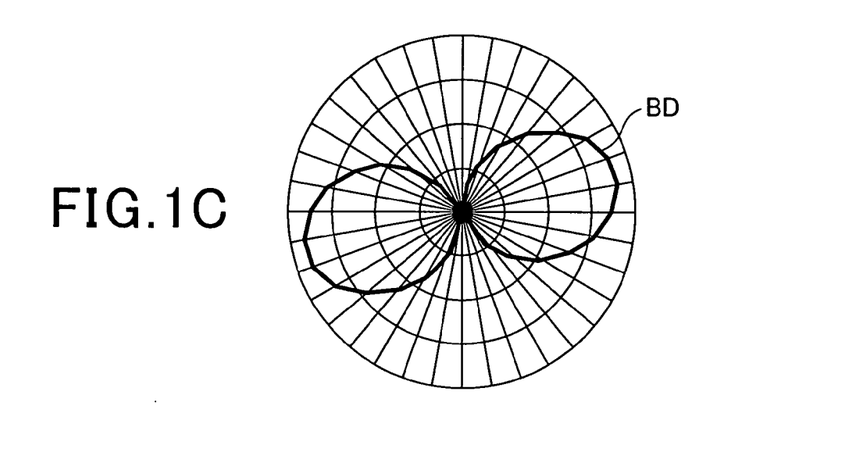
FIG. 1C is a diagram showing a polarization characteristic of reflection light from a BD.

FIG. 1A shows the polarization characteristic of reflection light obtained by irradiating a CD with the light beam (parallel rays and the circularly polarized state) having the wavelength 780 nm. FIG. 1B shows the polarization characteristic of reflection light obtained by irradiating a DVD with the light beam. FIG. 1C shows the polarization characteristic of reflection light obtained by irradiating a BD with the light beam. As shown in the diagrams, the polarization characteristic clearly varies according to the kind of an optical disc. As shown in FIG. 1A, the track pitch is sufficiently longer than the wavelength of the reflection light of the light beam emitted to the CD having the track pitch longer than the wavelength of the light beam, so that the reflection light substantially passes through the CD, and no large change appears in the polarization characteristic.

In FIGS. 1A to 1C, the rotation angles of the transmission axis and the directions of recording tracks are common. By detecting the variations according to the kinds of optical discs in the polarization characteristics shown in FIGS. 1A to 1C, the kinds of the optical discs can be discriminated from each other.

Figure 2A:
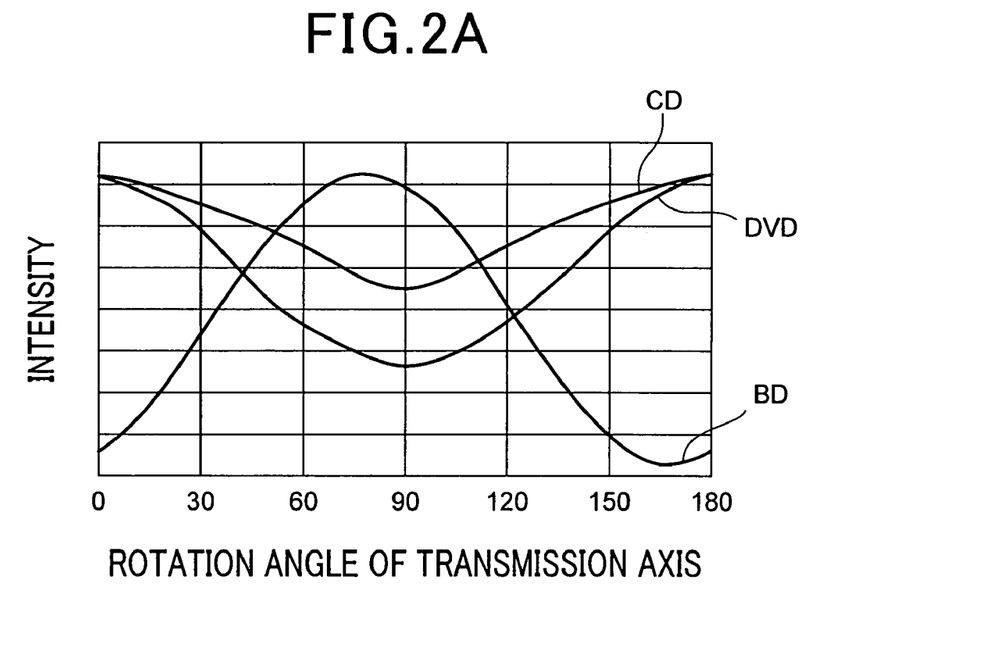
FIG. 2A is a graph showing the relation between the rotational angle of the transmission axis of a polarization filter and light reception intensity by kind of an optical disc.

More concretely, reflection light of the optical beam applied to any of the optical discs is allowed to simultaneously pass through a plurality of polarization filters whose rotation angles of transmission axis of the reflection light which is allowed to pass are different from each other. When the light reception intensities in the polarization filters are detected, a change as shown in FIG. 2A can be detected for each of the kinds of the optical discs.

As shown in FIGS. 1A to 1C, the polarization characteristic is point-symmetrical in any of the optical discs. Consequently, in the case of comparing the polarization characteristics among the optical discs, it is sufficient to compare the light reception intensities in the range of the rotation angle of the transmission axis of the polarization filter from 0 to 180 degrees.

Figure 2B:
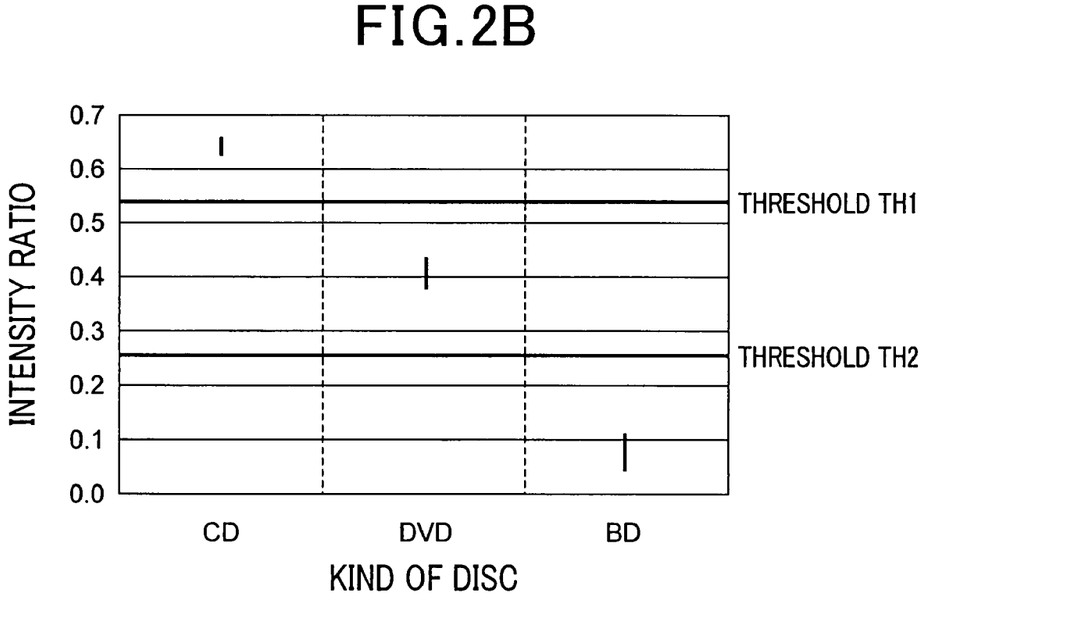
FIG. 2B is a diagram showing identification of the kind of an optical disc by using thresholds.

By computing the intensity ratio by dividing the lowest intensity by the highest intensity with respect to each of the various kinds, the various kinds can be compared with each other as shown in FIG. 2B. Thresholds (see thresholds TH1 and TH2 in FIG. 2B) by which the intensity ratios can be discriminated from each other are determined in advance. By detecting the relation between the thresholds TH1 and TH2 and intensity ratio obtained each time, the kind of an optical disc from which the intensity ratio is obtained can be determined clearly as CD, DVD, or BD.

Since the highest and lowest intensities are used for detecting the kind of an optical disc, the relation between the direction of a recording track on an optical disc and the rotation angle 0° of the transmission axis in the polarization filter can be arbitrarily set. The state of FIG. 2B is unchanged irrespective of the angle relation between the direction of the recording track and the rotation angle 0°.

(II) Embodiment

An embodiment of the present invention based on the principle will now be concretely described with reference to FIGS. 3 to 5.

Figure 3:
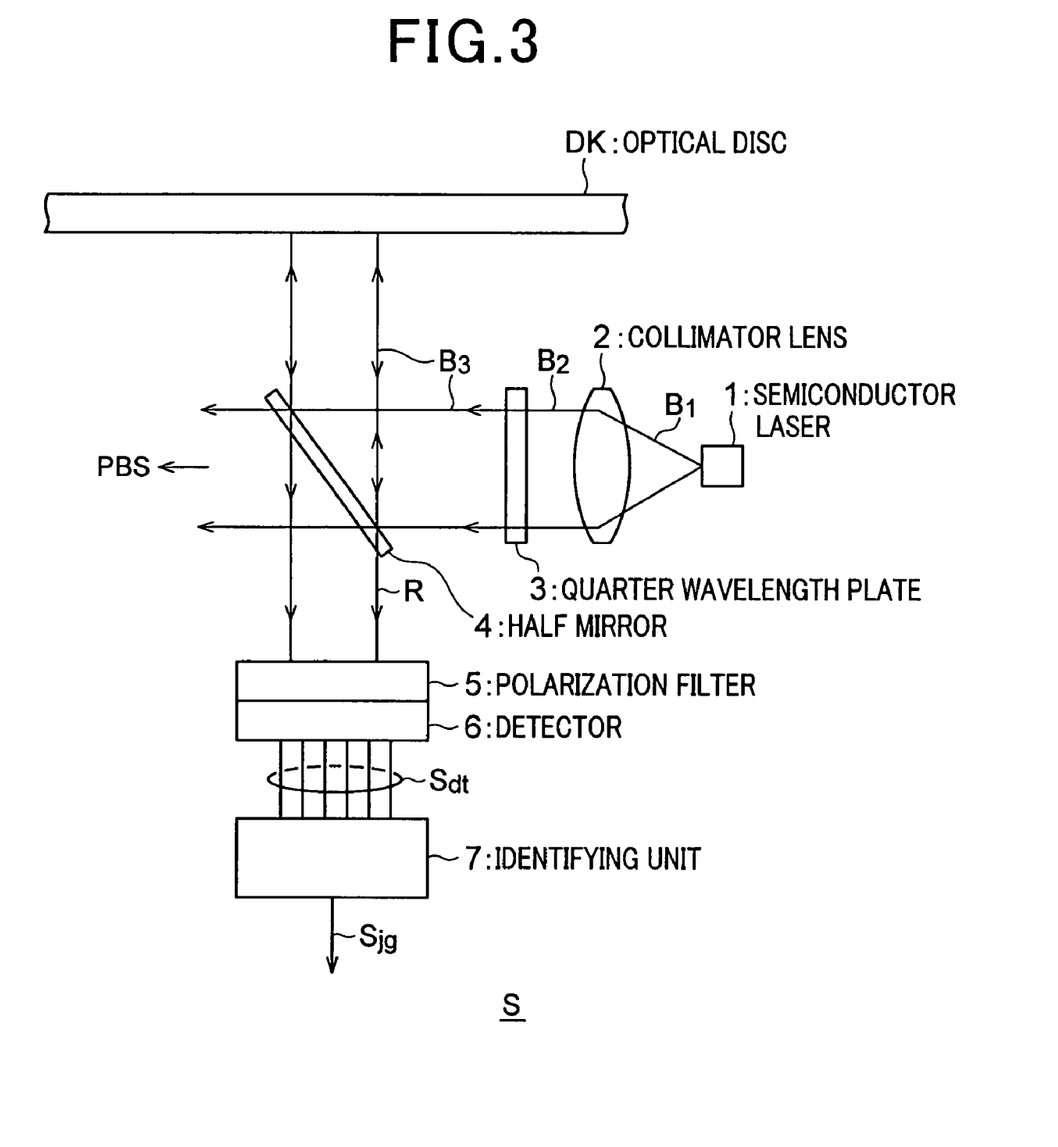
FIG. 3 is a diagram showing a schematic configuration of a kind identifying apparatus as an embodiment.

FIG. 3 is a block diagram showing a schematic configuration of the kind identifying apparatus of the embodiment. FIG. 4 is a block diagram showing a schematic configuration of the polarization filter and the detector in the kind identifying apparatus. FIG. 5 is a block diagram showing a schematic configuration of the identifying unit in the kind identifying apparatus.

As shown in FIG. 3, a kind identifying apparatus S of the embodiment includes a semiconductor laser 1 as irradiating means, a collimator lens 2, a quarter wavelength plate 3, a half mirror 4, a polarization filter 5 as polarizing means, a detector 6 as detecting means and photodetecting means, and an identifying unit 7 as identifying means.

Figure 4:
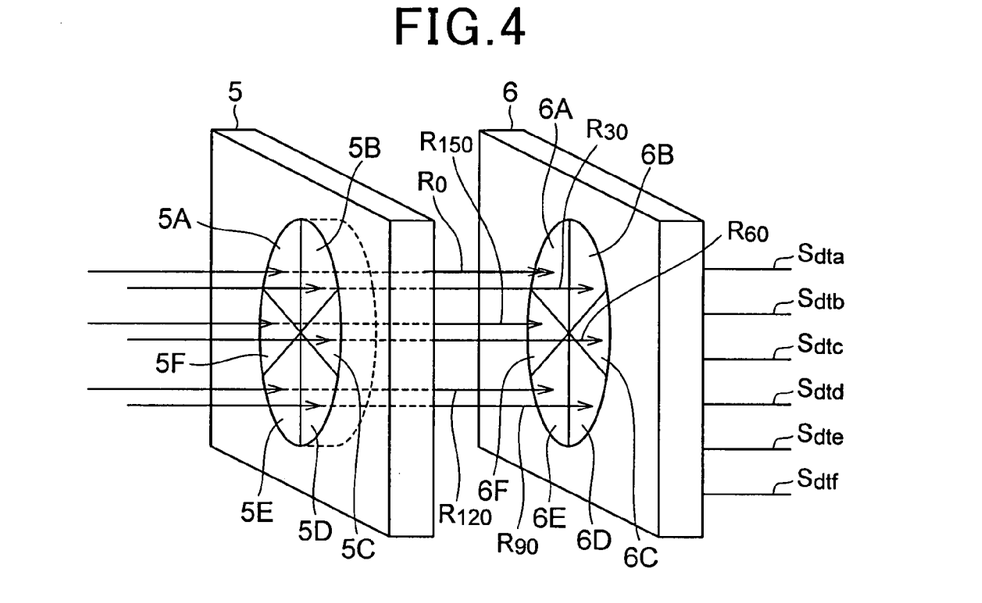
FIG. 4 is a diagram showing a detailed configuration of divided polarization filters and a detector in the embodiment.

As shown in FIG. 4, the polarization filter 5 is divided into six divided polarization filters 5A to 5F which divide a region irradiated with reflection light R from an optical disc DK which will be described later into six regions in the circumferential direction. The rotation angles of the transmission axis of the reflection light R to be passed in the divided polarization filters 5A to 5F are different from each other. More concretely, the divided polarization filter 5A has a characteristic of transmitting only a component in the reflection light R, whose rotation angle of the transmission axis is 0° in the reflection light R. The divided polarization filter 5B has a characteristic of transmitting only a component in the reflection light R, whose rotation angle of the transmission axis is 30° in the reflection light R. The divided polarization filter 5C has a characteristic of transmitting only a component in the reflection light R, whose rotation angle of the transmission axis is 60° in the reflection light R. The divided polarization filter 5D has a characteristic of transmitting only a component of the reflection light R, whose rotation angle of the transmission axis is 90° in the reflection light R. The divided polarization filter 5E has a characteristic of transmitting only a component in the reflection light R, whose rotation angle of the transmission axis is 120° in the reflection light R. The divided polarization filter 5F has a characteristic of transmitting only a component of the reflection light R, whose rotation angle of the transmission axis is 150° in the reflection light R.

Further, as shown in FIG. 4, the detector 6 has photodetectors 6A to 6F having shapes corresponding to the divided polarization filters 5A to 5F to independently receive the reflection light R passed through the divided polarization filters 5A to 5F, respectively. The photodetectors 6A to 6F receive the corresponding reflection light R (that is, the reflection light R including only the polarization components corresponding to the transmission axes of the divided polarization filters 5A to 5F, respectively) and output light reception signals Sdta to Sdtf corresponding to the photodetection intensities. The polarization filter 5 and the detector 6 may be overlapped as shown in FIG. 3 in practice. For easier understanding, the polarization filter 5 and the detector 6 are shown so as to be separated from each other in FIG. 4.

Figure 5:
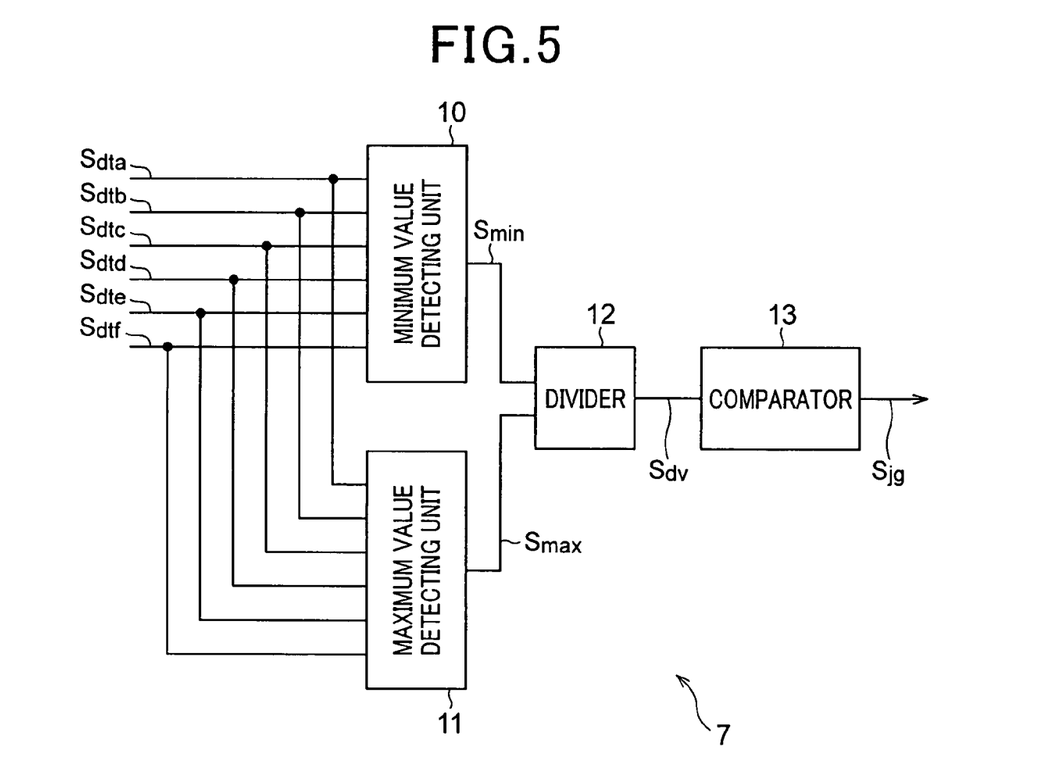
FIG. 5 is a block diagram showing a detailed configuration of an identifying unit in the embodiment.

The identifying unit 7 includes, as shown in FIG. 5, a minimum value detecting unit 10 to which the light reception signals Sdta to Sdtf are input, a maximum value detecting unit 11 to which the light reception signals Sdta to Sdtf are similarly input, a divider 12, and a comparator 13. In the comparator 13, the thresholds TH1 and TH2 shown in FIG. 2B are nonvolatile-stored.

Next, the operation of the kind identifying apparatus S of the embodiment will be described.

At a preset timing such as a timing when an optical disc (any of the CD, DVD, and BD) whose kind is to be identified is loaded in, for example, an optical disc reproducing apparatus provided with the kind identifying apparatus S of the embodiment, the semiconductor laser 1 emits a light beam $B_1$ having a preset wavelength for recording or reproduction (for example, 780 nm as the wavelength for recording/reproducing information to/from a CD). The light beam $B_1$ in the state of diffused light enters the collimator lens 2.

The collimator lens 2 converts the light beam $B_1$ to a parallel ray beam $B_2$ which is incident on the quarter wavelength plate 3.

The quarter wavelength plate 3 converts the parallel ray beam $B_2$ from a linearly polarized state to a circularly polarized state and the resultant beam is emitted as a circularly-polarized light beam $B_3$ to the half mirror 4.

The half mirror 4 reflects a part of the circularly-polarized light beam $B_3$ toward the optical disc DK so that the reflected circularly-polarized light beam $B_3$ is applied as it is (without being condensed) to the optical disc DK.

The circularly-polarized light beam $B_3$ applied to the optical disc DK is reflected by the optical disc DK and is applied again as the reflection light R including the polarization characteristic of the circularly polarized light beam $B_3$ on the optical disc DK to the half mirror 4.

Next, the reflection light R passed through the half mirror 4 is applied to the divided polarization filters 5A to 5F in the polarization filter 5 (refer to FIG. 4).

As shown in FIG. 4, reflection light $R_0$ (as the component whose rotation angle of the transmission axis is 0°) passed through the divided polarization filter 5A in the reflection light $R_0$ is received by the photodetector 6A, and the light reception signal Sdta corresponding to the light reception intensity is generated and output to the minimum value detecting unit 10 and the maximum value detecting unit 11 (refer to FIG. 5). Reflection light $R_{30}$ (as the component whose rotation angle of the transmission axis is 30°) passed through the divided polarization filter 5B in the reflection light R is received by the photodetector 6B, and the light reception signal Sdtb corresponding to the light reception intensity is generated and output to the minimum value detecting unit 10 and the maximum value detecting unit 11. Reflection light $R_{60}$ (as the component whose rotation angle of the transmission axis is 60°) passed through the divided polarization filter 5C in the reflection light R is received by the photodetector 6C, and the light reception signal Sdtc corresponding to the light reception intensity is generated and output to the minimum value detecting unit 10 and the maximum value detecting unit 11. Reflection light $R_{90}$ (as the component whose rotation angle of the transmission axis is 90°) passed through the divided polarization filter 5D in the reflection light R is received by the photodetector 6D, and the light reception signal Sdtd corresponding to the light reception intensity is generated and output to the minimum value detecting unit 10 and the maximum value detecting unit 11.

Reflection light $R_{120}$ (as the component whose rotation angle of the transmission axis is 120°) passed through the divided polarization filter 5E in the reflection light R is received by the photodetector 6E, and the light reception signal Sdte corresponding to the light reception intensity is generated and output to the minimum value detecting unit 10 and the maximum value detecting unit 11. Finally, reflection light $R_{150}$ (as the component whose rotation angle of the transmission axis is 150°) passed through the divided polarization filter 5F in the reflection light R is received by the photodetector 6F, and the light reception signal Sdtf corresponding to the light reception intensity is generated and output to the minimum value detecting unit 10 and the maximum value detecting unit 11.

Consequently, the minimum value detecting unit 10 detects the light reception signal having the weakest light reception intensity among the light reception signals Sdta to Sdtf, and outputs the detected light reception signal as the minimum light reception signal Smin to the divider 12.

Concurrently, the maximum value detecting unit 11 detects the light reception signal having the strongest light reception intensity among the light reception signals Sdta to Sdtf, and outputs the detected light reception signal as the maximum light reception signal Smax to the divider 12.

The divider 12 divides the light reception intensity indicated by the minimum light reception signal Smin by the light reception intensity indicated by the maximum light reception signal Smax and outputs the result as a division signal Sdv to the comparator 13.

Finally, the comparator 13 compares the division result (intensity ratio) indicated by the division signal Sdv with the thresholds TH1 and TH2 shown in FIG. 2B. When the division result is larger than the threshold TH1, a determination signal Sjg indicating that the optical disc from which the reflection light R is obtained is a CD is generated and output to a not-shown reproduction control unit and the like. Similarly, when the division result is smaller than the threshold TH1 and larger than the threshold TH2, a determination signal Sjg indicating that the optical disc from which the reflection light R is obtained is a DVD is generated and output to a not-shown reproduction control unit and the like. When the division result is smaller than the threshold TH2, a determination signal Sjg indicating that the optical disc from which the reflection light R is obtained is a BD is generated and output to a not-shown reproduction control unit and the like.

After that, various parameters and the like are set in accordance with the determination signal Sjg, and information is optically recorded or reproduced to/from the optical disc whose kind is identified.

The number of divisions in the polarization filter 5 in the foregoing embodiment (that is, the number of divided polarization filters) is experimentally determined on the basis of manufacturability, cost, and the like of the polarization filter 5 and the precision of identifying the kind of an optical disc.

Figure 6:
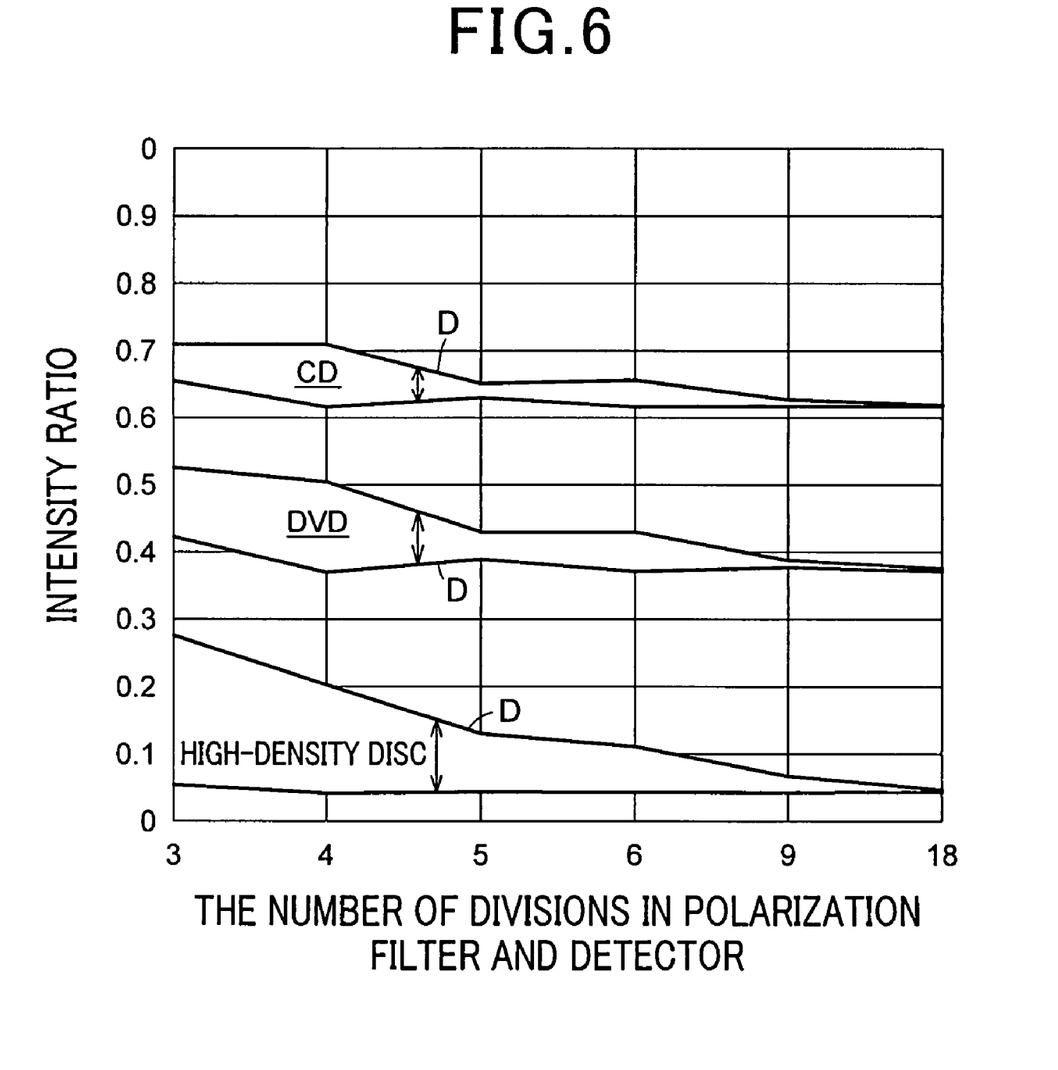
FIG. 6 is a diagram showing the relation between the number of divisions of the polarization filter and the like and the intensity ratio.

That is, as shown in FIG. 6, when the number of divisions is small, variations D occur in the division results in the optical discs. Consequently, the number of divisions is preferably large from the viewpoint of precision at the time of identifying the kind using the thresholds TH1 and TH2 in the comparator 13 (that is, the variations D are preferably small). On the other hand, when the number of divisions is large, the manufacturability, cost, and the like of the polarization filter 5 decrease.

In the foregoing embodiment, therefore, considering the balance of the two factors, the number of divisions of the polarization filter 5 is set as "6".

When the number of divisions of the polarization filter 5 is set as 4 or larger as shown in FIG. 6, the determination precision is maintained to some extent.

In the case of using the semiconductor laser 1 also for recording/reproducing information to/from the optical disc DK, a part passing the half mirror 4 in the circularly polarized light beam $B_3$ obtained from the semiconductor laser 1 via the collimator lens 2 and the quarter wavelength plate 3 is used and guided to a not-shown polarization beam splitter (shown as "PBS" in FIG. 3) or the like so as to be provided for the recording/reproduction. Since the identification of the kind of the optical disc DK is already finished at the timing of executing the recording/reproduction, the identifying unit 7 does not function.

As described above, the kind identifying apparatus S of the embodiment irradiates the optical disc DK with the circularly polarized light beam $B_3$ as parallel rays in the circularly polarized state without condensing it and, on the basis of the polarization characteristic of the reflection light R, identifies the kind of the optical disc DK in accordance with the interval of the recording tracks. Consequently, the kind of the optical disc DK can be identified promptly without performing a process of condensing the circularly polarized light beam $B_3$.

Since the circularly polarized light beam $B_3$ is emitted to the optical disc DK without being condensed, the temperature in the irradiation position on the optical disc DK does not increase, and occurrence of recording of unnecessary information, unexpected erasure of recorded information or the like can be prevented.

Further, since the circularly polarized light beam $B_3$ is emitted to the optical disc DK without being condensed, it is unnecessary to make an objective lens for condense close to the optical disc DK, a situation that the optical disc DK and the objective lens collide with each other and are broken can be prevented.

Further, reflection light passed through the plurality of divided polarization filters whose rotational angles of the transmission axis are different from each other is received, and the kind of the optical disc DK is identified on the basis of the intensity ratio between the reflection light having the highest intensity and the reflection light having the lowest intensity in reflection light passed through the partial areas. Consequently, without providing a complicated mechanism, the kind of the optical disc DK can be promptly identified.

In addition, the kind of the optical disc DK is identified on the basis of the relation between the preset threshold TH1 or TH2 and each of the intensity ratios, so that the kind can be identified easily and reliably.

Further, the divided polarization filters 5A to 5F in the polarization filter 5 are obtained by radially dividing the region through which the reflection light R passes by using the optical axis of the reflection light R as a center. Thus, the polarization filter 5 can be manufactured by a simple manufacturing process.

Further, since the polarization filter 5 is divided into four or more divided polarization filters, the kind can be identified while obtaining the balance between manufacturability of the polarization filter 5 and the precision of identification of the kind.

Since the kind of the optical disc DK is identified by using the circularly polarized light beam $B_3$ which is for recording/reproducing information, the configuration of the information recording apparatus or the information reproducing apparatus using the kind identifying apparatus S can be made simpler.

Both of the kind of a recordable optical disc in which groove tracks are formed in advance and the kind of a read-only optical disc in which recording tracks are formed in advance by a train of phase pits can be identified accurately.

Further, by using any one of a CD, DVD, or high-density optical disc as the kind of the optical disc DK, a plurality of kinds of optical discs DK having different recording densities can be discriminated from each other in accordance with the intervals of recording tracks.

In the foregoing embodiment, the case where the divided polarization filters 5A to 5F in the polarization filter 5 are divided radially has been described. Other than the case, the divided filters may be formed in other forms as long as their regions through which the reflection light R passes in the polarization filter 5 have the same area. For example, a polarization filter 50 including divided polarization filters 50A to 50F each having a rectangular shape as shown in FIG. 7A may be formed, or a polarization filter 51 in which divided polarization filters 51A to 51F each other a rectangular shape as shown in FIG. 7B may be disposed circularly.

Figure 7A:
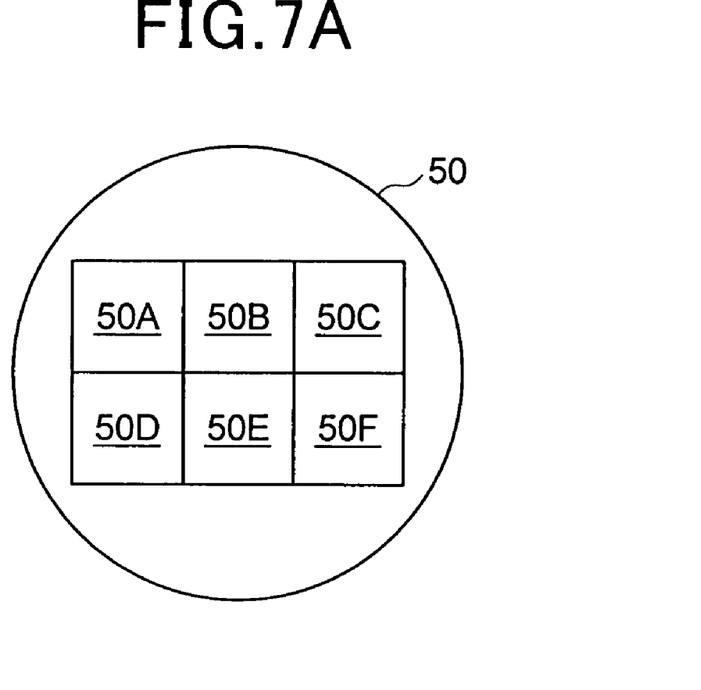
FIGS. 7A and 7B are diagrams showing first and second modifications, respectively, of the polarization filter.
Figure 7B:
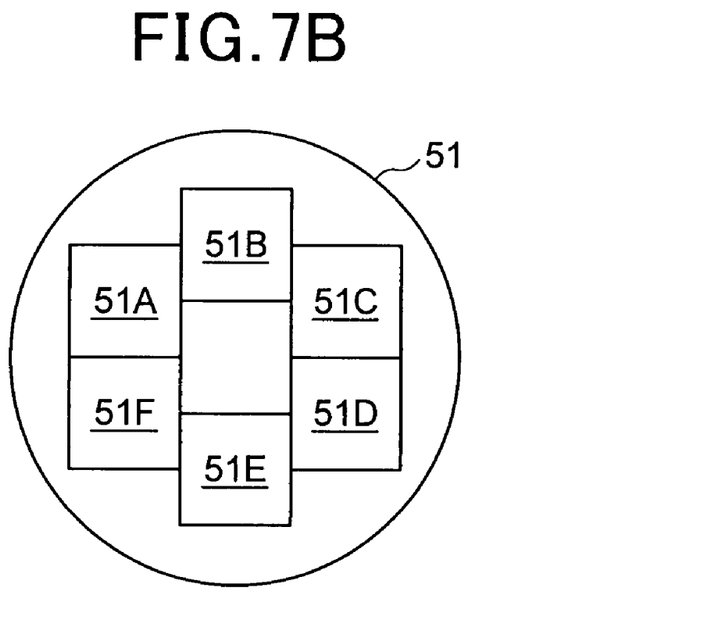

Obviously, the detector having photodetectors each having a shape corresponding to a divided polarization filter is provided in any of the cases of FIGS. 7A and 7B.

(III) Modifications

Modifications of the present invention will now be described.

In the foregoing embodiment, the case of using the polarization filter 5 in which the divided polarization filters 5A to 5F are fixed as shown in FIG. 4 has been described. Alternatively, by rotating a polarization filter having only one transmission axis and detecting the intensity of the reflection light R every preset rotation angle, the light reception signals Sdta to Sdtf may be obtained in a time sharing manner. After that, the kind of the optical disc DK is identified by using the intensity ratio between the light reception signal having the highest intensity and the light reception signal having the lowest intensity in a manner similar to the embodiment.

In this case, while rotating the polarization filter, the reflection light R passing through the polarization filter is received. With rotation of the polarization filter, the kind of the optical disc DK is identified on the basis of the intensity ratio between the reflection light R having the highest intensity and the reflection light R having the lowest intensity in the received reflection light. Consequently, the kind of the optical disc DK can be identified without using the polarization filter whose region is divided.

As the kind identifying method by detecting the polarization characteristic, the method of comparing the intensity ratio between the highest intensity and the lowest intensity with the thresholds TH1 and TH2 among the divided polarization filters 5A to 5F is used. Alternatively, the kind may be determined by directly detecting the polarization characteristic itself shown in FIG. 1 included in the reflection light R and identifying the kind on the basis of the difference of the polarization characteristics. Specifically, for example, as disclosed in the following non-patent document 2, when the x and y components in the polarization characteristic (elliptical polarization characteristic) shown in FIG. 1 are set as $$x = Ax \times \exp(i\delta x)$$

$$y = Ay \times \exp(i\delta y),$$

$\alpha$ and $\delta$ given by $\tan \alpha = Ay/Ax$ and $\delta = \delta y - \delta x$ are obtained, respectively. The kind can be identified from the obtained values $\alpha$ and $\delta$.

In the case of using the method, it is important to determine the directions of (x, y) as coordinates. Specifically, it is necessary to consider the point that the direction of a recording track in the coordinates when the optical disc DK is irradiated with the circularly polarized light beam $B_3$ exerts an influence on the kind identification result.

The process of outputting the determination signal Sjg in the identifying unit 7 may be executed by using a computer program. By recording the computer program on a information recording medium such as a flexible disc or a hard disc or obtaining the computer program through the Internet or the like and recording it, and reading and executing the program by a general computer, the computer can be made function as the identifying unit 7.

The invention claimed is:

1. An optical recording medium identifying apparatus comprising:
    an irradiating device for emitting a light beam formed as parallel rays in a circularly polarized state without condensing to an optical recording medium in which recording tracks are formed;
    a detecting device for detecting a polarization characteristic in reflection light from the recording medium of the emitted light beam; and
    an identifying device for identifying the kind of the recording medium according to interval of neighboring recording tracks on the basis of the detected polarization characteristic.

2. The optical recording medium identifying apparatus according to claim 1, wherein the detecting device comprises:
    a polarizing device where an area through which the reflection light passes is divided in a plurality of partial regions of different polarization characteristics; and
    a photodetecting device corresponding to the partial regions and receiving the reflection light passed through the partial regions on the partial region unit basis, and
    the identifying device identifies the kind according to the interval on the basis of the intensity ratio between the reflection light having the highest intensity and the reflection light having the lowest intensity in the reflection light received by the photodetecting device.

3. The optical recording medium identifying apparatus according to claim 2, wherein the identifying device identifies the kind according to the interval by comparing the value of the intensity ratio with a preset threshold.

4. The optical recording medium identifying apparatus according to claim 3, wherein the partial regions have the same area.

5. The optical recording medium identifying apparatus according to claim 2, wherein the partial regions have the same area.

6. The optical recording medium identifying apparatus according to claim 2,
    wherein rotation angles of transmission axis with respect to the reflection light in the partial regions are different from each other.

7. The optical recording medium identifying apparatus according to claim 2,
    wherein the partial regions in the polarizing device are partial regions obtained by radially dividing a region through which the reflection light passes using an optical axis of the reflection light as a center.

8. The optical recording medium identifying apparatus according to claim 2, wherein the region through which the reflection light passes is divided into four or more partial regions.

9. The optical recording medium identifying apparatus according to claim 2,
wherein the partial regions in the polarizing device are rectangular partial regions disposed in a region through which the reflection light passes.

10. The optical recording medium identifying apparatus according to claim 1, wherein the detecting device comprises:
a rotating device for rotating the polarizing device having a linear polarization characteristic in a region through which the reflection light passes; and
a photodetecting device for receiving the reflection light passed through the polarizing device every preset rotation angle in rotation of the polarizing device, and
the identifying device identifies the kind according to the interval on the basis of the intensity ratio between the reflection light having the highest intensity and the reflection light having the lowest intensity in the reflection light received by the photodetecting device every preset rotation angle.

11. The optical recording medium identifying apparatus according to claim 1, wherein the light beam is a light beam having the same wavelength as that of a light beam used for recording/reproducing information to/from any one of the plurality of kinds of recording media.

12. The optical recording medium identifying apparatus according to claim 1,
wherein the recording medium is an optical disc, and
the recording track is a recording track in which a plurality of phase pits are arranged in the circumferential direction of the optical disc or a groove track.

13. The optical recording medium identifying apparatus according to claim 1,
wherein the kind of any one of a CD (Compact Disc), a DVD (Digital Versatile Disc) having the interval narrower than that of the CD, and a high-density optical disc having the internal narrower than that of the DVD.

14. An optical recording medium identifying method comprising:
an irradiating step of emitting a light beam formed as parallel rays in a circularly polarized state without condensing to an optical recording medium in which recording tracks are formed;
a detecting step of detecting a polarization characteristic in reflection light from the recording medium of the emitted light beam; and
an identifying step of identifying the kind of the recording medium according to interval of neighboring recording tracks on the basis of the detected polarization characteristic.

15. A non-transitory computer-readable storage medium that stores a computer-executable program for an optical recording medium identifying apparatus, the program comprising steps of:
emitting a light beam formed as parallel rays in a circularly polarized state without condensing to an optical recording medium in which recording tracks are formed;
detecting a polarization characteristic in reflection light from the recording medium of the emitted light beam; and
identifying the kind of the recording medium according to interval of neighboring recording tracks on the basis of the detected polarization characteristic.

* * * * *